United States Patent [19]
Jacobs

[11] Patent Number: 5,363,289
[45] Date of Patent: Nov. 8, 1994

[54] CONTROL APPARATUS FOR LIMITING VOLTAGE ON A CORE RESET CAPACITOR

[75] Inventor: Mark E. Jacobs, Dallas, Tex.

[73] Assignee: AT&T Bell Laboratories, Murray Hill, N.J.

[21] Appl. No.: 991,041

[22] Filed: Dec. 15, 1992

[51] Int. Cl.$^5$ .......................................... H02M 3/335
[52] U.S. Cl. ........................................ 363/56; 363/21; 363/79; 363/97
[58] Field of Search ............... 363/20, 21, 56, 79, 363/97; H02M 3/335

[56] References Cited

U.S. PATENT DOCUMENTS

| | | | |
|---|---|---|---|
| 4,441,146 | 4/1984 | Vinciarelli | 363/20 |
| 4,760,512 | 7/1988 | Loftus | 363/20 |
| 4,809,148 | 2/1989 | Barn | 363/20 |
| 5,019,957 | 5/1991 | Wilkinson | 363/56 |
| 5,066,900 | 11/1991 | Bassett | 363/20 |
| 5,099,406 | 3/1992 | Harada et al. | 363/20 |
| 5,126,931 | 6/1992 | Jitaru | 363/21 |
| 5,206,800 | 4/1993 | Smith | 363/21 |

FOREIGN PATENT DOCUMENTS

| | | | |
|---|---|---|---|
| 0508664 | 10/1992 | European Pat. Off. | H02M 3/337 |
| 56-94963 | 7/1981 | Japan | 363/21 |
| 58-66578 | 4/1983 | Japan | 363/21 |
| 4-210775 | 7/1992 | Japan | H02M 3/28 |
| 2073918 | 10/1981 | United Kingdom | 363/21 |

OTHER PUBLICATIONS

"Zero Voltage PWM, Double Ended Converter" by, I. D. Jitaru HFPC—Proceedings, May 1992, pp. 394–405.
"Constant Frequency, Forward Converter With Resonant Transistion", I. Jitaru, HFPC '91 Proceedings, pp. 282–292, Jun. 1991.

Primary Examiner—Jeffrey L. Sterrett
Attorney, Agent, or Firm—Alfred G. Steinmetz

[57] ABSTRACT

A power converter circuit requiting the periodic reset of a core of the power transformer includes a control circuit operative to alter a response of the converters voltage regulation feedback control to limit and/or control the power switch duty cycle to regulate a voltage of the reset capacitor whenever the reset capacitor sustains a voltage above a preset threshold.

9 Claims, 3 Drawing Sheets

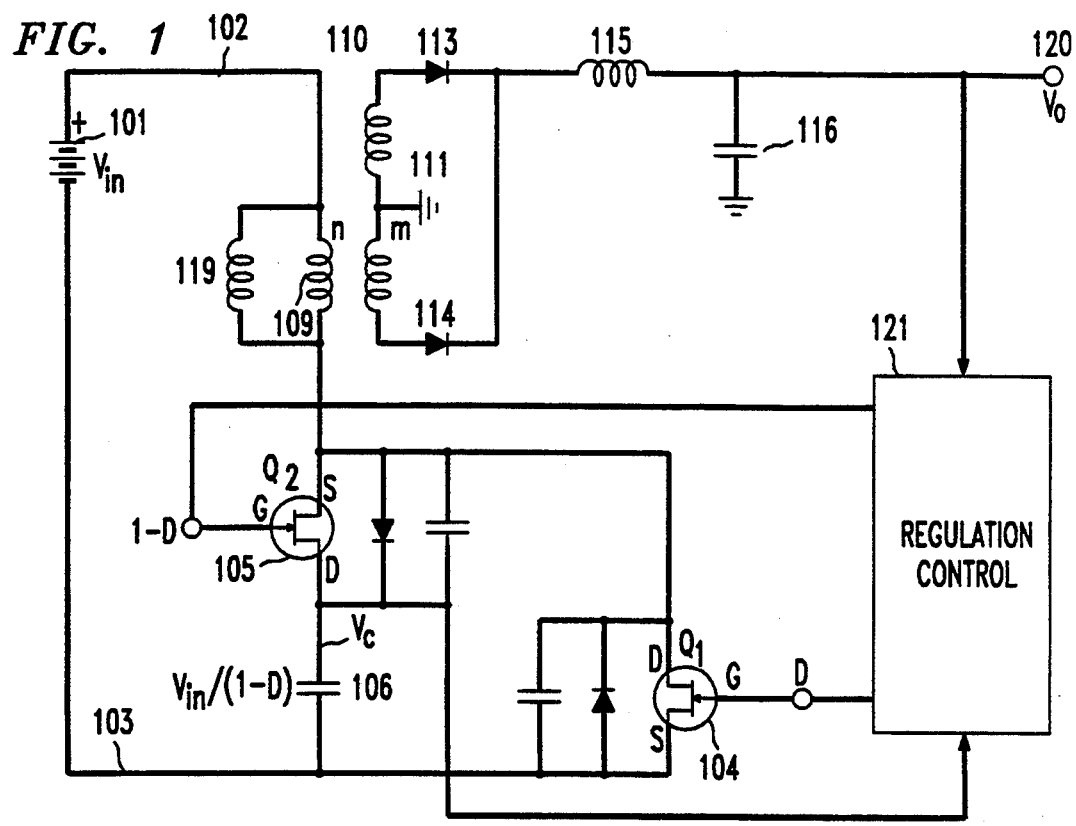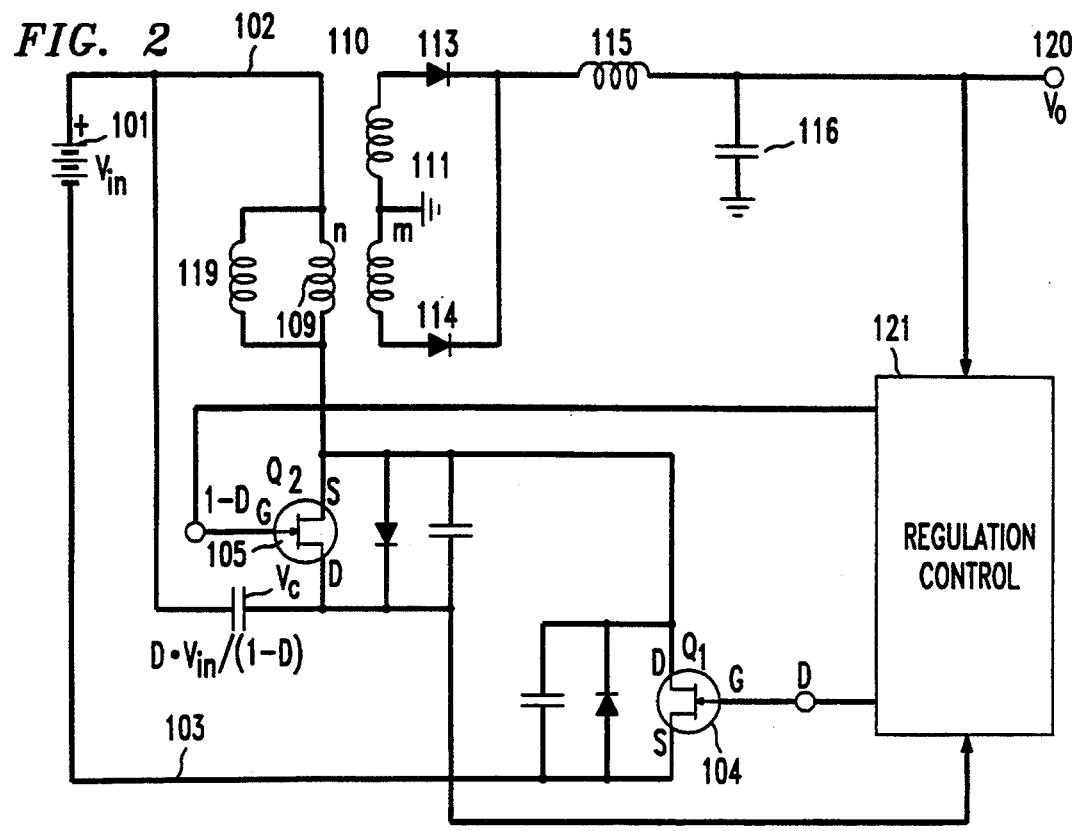

CONTROL APPARATUS FOR LIMITING VOLTAGE ON A CORE RESET CAPACITOR

FIELD OF THE INVENTION

This invention relates to power converters in which a magnetic core in the converter's power train requires active control of a flux therein and in particular to the control of the voltage of a capacitor used in circuitry for achieving this control.

BACKGROUND OF THE INVENTION

Forward, push-push, flyback and similar converter topologies require that the power transformer core be periodically reset in each cycle of operation. The core reset voltage is supplied by a voltage reset capacitor which is periodically charged each cycle to provide the needed reset voltage.

The voltage due to charge stored on the reset capacitor is dependent on the duty cycle of the converter's power switch. Accordingly, the circuitry is designed so that the proper reset voltage is stored by the reset capacitor during normal operation (i.e., normal duty cycles)

The input voltage to the converter may drop below the low limit operating voltage for which the converter is designed. These low input voltage conditions can be caused by "brownout" conditions in the ac mains, or batteries discharged beyond their capacity, or system faults. At low input voltages, outside the normal designed input voltage range of the converter, the duty cycle of the power switches tends toward unity. This causes abnormally high voltages to be supplied by the reset capacitor, which may cause a failure of the converter circuit.

Similarly, if the input voltage rises above the high limit voltage of the input voltage range, the reset capacitor can attain a very high voltage level which may also destroy components of the converter.

SUMMARY OF THE INVENTION

A power converter having a charge storage capacitor used for periodic reset of a transformer core monitors the voltage of the voltage storage capacitor and controls the feedback regulation of the converter to limit the maximum voltage which may be attained by the voltage storage capacitor.

In one embodiment of the invention, a power converter circuit requiring the periodic reset of a core of the power transformer includes a control circuit operative to alter a response of the converter's voltage regulation feedback control to limit and/or control the power switch duty cycle to regulate a voltage of the reset capacitor whenever the reset capacitor sustains a voltage above a preset threshold.

If, during the operation of the power converter, the reset capacitor voltage increases beyond its prescribed limit, a signal representing the reset capacitor voltage is superimposed onto the voltage regulation feedback path so that the regulation control loop regulates this capacitor voltage, rather than the output voltage. When the reset capacitor voltage falls to its prescribed operating range, normal feedback operation to regulate the output voltage resumes.

Superposition of the reset capacitor voltage onto the voltage regulation feedback path is achieved, in the illustrative embodiment, with ORing diodes, or with ORing diodes whose characteristics are enhanced with operational amplifiers.

In another embodiment of the invention, the attainment of a high voltage on the reset capacitor exceeding a maximum threshold value, causes the voltage regulation of the output voltage to be inhibited so that the duty cycle of the power switches is limited to a preset low value until the reset capacitor voltage drops to a safe value.

BRIEF DESCRIPTION OF THE DRAWING

In the Drawing:

FIG. 1 is a schematic of a power converter circuit requiring periodic core reset;

FIG. 2 is another schematic of a power converter circuit requiring periodic core reset;

DETAILED DESCRIPTION

Figure 3:
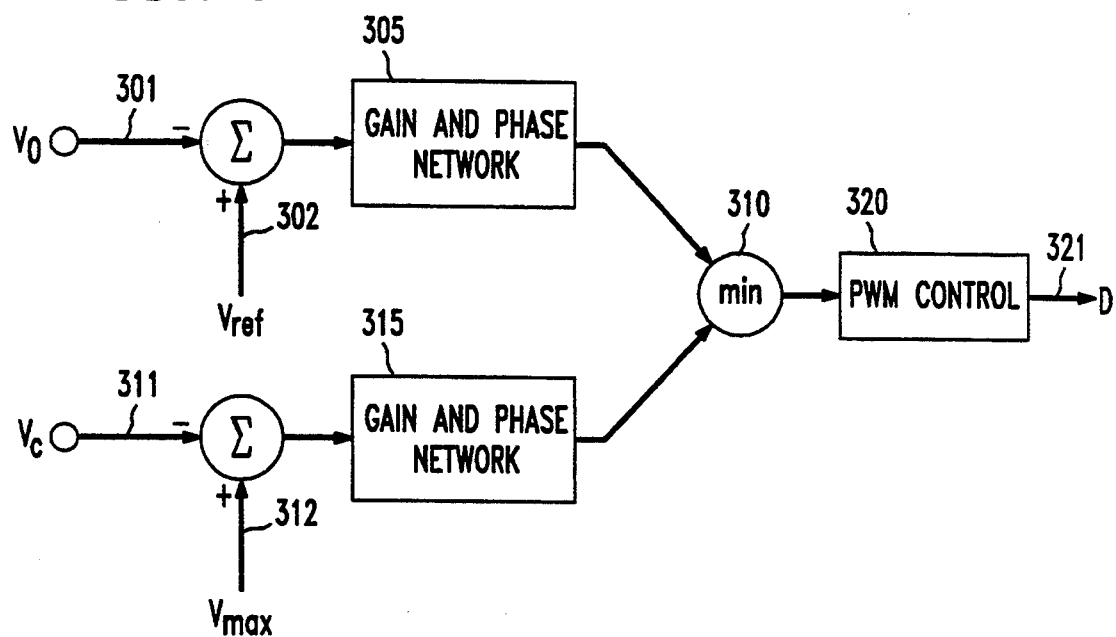
FIG. 3 is a block schematic of a control system for regulating a voltage of a reset capacitor voltage.

Two push push topology power converter schematics requiring periodic transformer core reset are shown in FIGS. 1 and 2. In the converter of FIG. 1 DC input voltage supplied by a voltage source 101, to input lead 102, is periodically applied to a primary winding 109 of the power transformer 110 in response to periodic switching of the power switch FETs 104 and 105. FET 104 is directly connected to a return lead 103 to the voltage source 101. FET 105 is connected to the return lead 103, via a reset capacitor 106. In operation the flux in the core of transformer 110 is driven by FET 104 in one direction and hence the core may saturate. This reset capacitor 106 accumulates a stored voltage during operation of the converter and is connected to the transformer primary winding 109 when the FET 105 is conducting and in order to reset the core of the transformer 110 by recycling the flux stored in its magnetizing inductance 119.

Power output to an output terminal 120 is supplied by a tapped secondary 111 of the power transformer 110 through the rectifying diodes 113 and 114 and a filter including inductor 115 and capacitor 116.

A regulation control 121 is connected to monitor the output voltage at terminal 120 and the voltage of reset capacitor 106. These inputs are utilized to generate the drive signals applied to the FETs 104 and 105. These drive signals modulate the FETs to control one of the monitored voltages. The output voltage is regulated when the sensed reset capacitor voltage is deemed satisfactory and when the reset capacitor voltage exceeds a threshold level the FETs are modulated to control the voltage of the reset capacitor.

A second push push converter topology in FIG. 2 has the reset capacitor 106 connected, via lead 212, to the input lead 102 instead of the return lead.

The reset capacitor voltage in these converters (FIGS. 1, 2) can be described in the steady state by Equations 1 or 2. (Equation 1 applies to circuits configured similar to FIG. 1, and Equation 2 to circuits configured similar to FIG. 2. In these equations, D is the duty cycle, which is the fraction of cycle time that the FET switch 104 is conducting.)

$$V_c = V_{in}/(1-D) \quad (1)$$

for the topology at FIG. 1, and $$V_c = (V_{in} \cdot D)/(1-D) \quad (2)$$

for the topology at FIG. 2.

For low dc input voltages, sustained outside the normal operating range of the converter, the duty cycle D can approach unity, in an attempt to maintain the regulated output voltage, resulting in arbitrarily high values for the voltage of the reset capacitor 106, causing circuit failure. The high reset capacitor voltage, occurring at low input voltage, is caused by the duty cycle of the power switch, increasing arbitrarily close to unity. In instances where the input voltage is high exceeding the input range upper voltage value the reset capacitor also assumes a high voltage above a prescribed limit. The duty cycle, of the power switching in both instances, is limited to reduce this reset capacitor voltage by altering the feedback control loop when the reset capacitor sustains a voltage higher than a prescribed limit. The regulation control 121, hence, limits the reset capacitor voltage when the dc input voltage falls outside the normal operating range for the converter.

The functional implementation of a feedback regulation control, embodying the principles of the invention, is shown in the FIG. 3. In FIG. 3, $V_0$, applied to the terminal 301, is the output voltage of the dc-dc converter represented in either FIG. 1 or FIG. 2. Each converter is required to be regulated so that its output voltage is equal to a regulated output voltage. Following commonly used control practice for power supplies, a Vref, on lead 302, is subtracted from the monitored output voltage $V_0$ (or a voltage related to $V_0$) in the summing circuit 303 and the difference voltage is then amplified. The resulting amplified difference signal is then modified by a network 305 to alter its frequency-dependent gain and phase characteristics. This frequency-dependent network is represented on FIG. 3 by the network 305. This signal is then used by a PWM control process to set the switching frequency and duty cycle D for the main power switching FET 105 shown in FIGS. 1 and 2. The characteristics of the network 305 and the PWM controller are selected so that the resulting system is stable and so that it exhibits desirable response characteristics such as response time, ringing, and overshoot.

In a similar manner, the reset capacitor voltage $V_c$ in FIG. 3 is applied to the input lead 311. This voltage, representing the reset capacitor voltage, is required to be less than a maximum value $V_{max}$ applied to a summing circuit 313 on lead 312. The signal path on FIG. 3 begins with the input $V_c$ on lead 311 and ends in the duty cycle control pulse D on output lead 321. When the reset capacitor voltage $V_c$ exceeds $V_{max}$, the value of the reset capacitor voltage is regulated to the value $V_{max}$. The frequency-dependent gain and phase network 315, in conjunction with the PWM controller, is selected to provide stable operation of this circuit, also with desirable response characteristics.

The output of the gain and phase networks 305 and 315 is applied to a switch 310, which is operative to transmit the maximum value, applied to it by the networks 305 and 315. This allows the PWM controller 320 to regulate the output voltage, to the voltage specified by $V_{ref}$, as long as the reset capacitor voltage is less than $V_{max}$. Otherwise, the PWM controller regulates the reset capacitor voltage to the a regulated value determined by $V_{max}$. Thus, whenever the output voltage is the operative variable in the feedback control loop, the reset capacitor voltage is regulated, and whenever the reset capacitor voltage is the operative variable, the output voltage is regulated. In this illustrative embodiment these regulated values are $V_{max}$ and $V_{ref}$.

Figure 4:
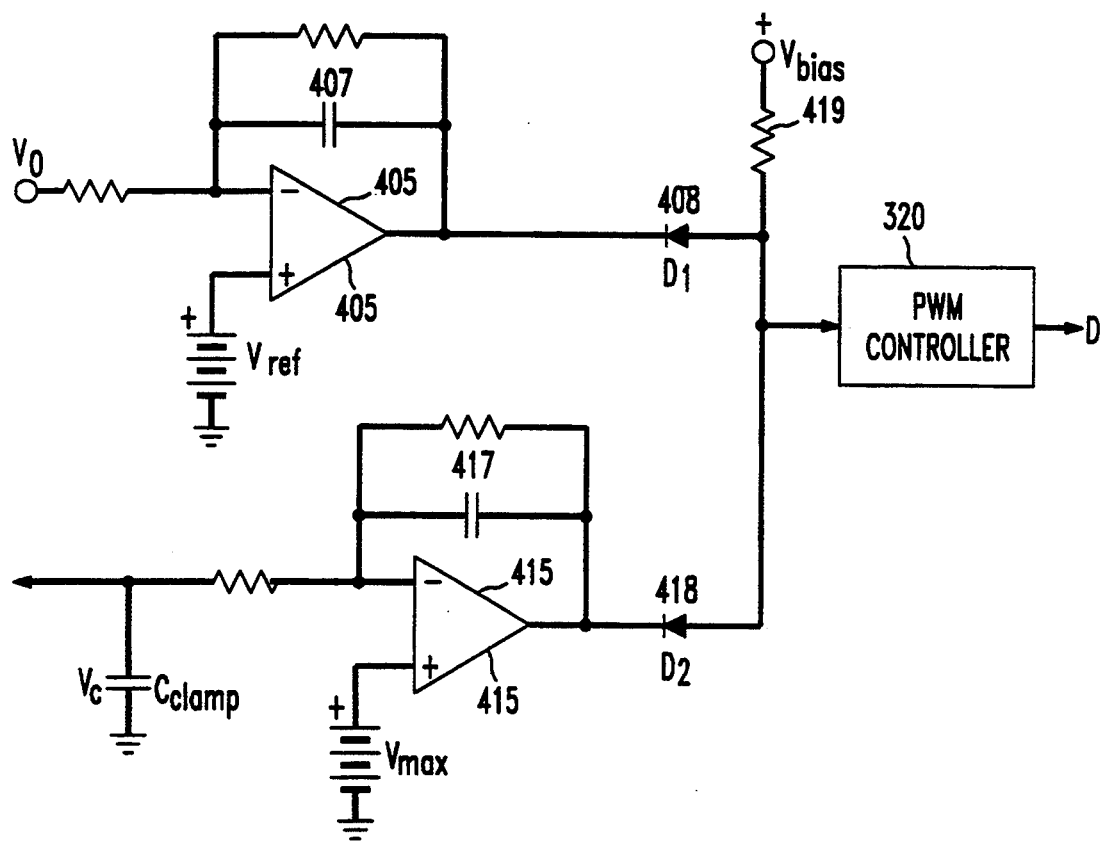
FIG. 4 is a block schematic of an illustrative regulation circuit for the power converters of FIGS. 1 and 2 which regulates a voltage of the reset capacitor when this voltage exceeds a predetermined limit.

A more detailed implementation of the regulation control circuitry shown in FIG. 3 is shown in FIG. 4. Two operational amplifiers 405 and 415 are shown which provide the amplification functions for the networks 305 and 315 shown in FIG. 3. Simple R-C networks, 407 and 417, connected to the operational amplifiers provide means of controllably shaping the frequency characteristics of these circuits. A particular circuit implementation may require the diodes 408 and 418, to be connected to the amplifier outputs, select the minimum of the two error signals, $\delta V_1$ and $\delta V_2$ supplied by the two operational amplifiers 405 and 415.

The circuit details will become apparent to those skilled in the art from the following description of its operation. When the input voltage to the DC-DC converter lies within its specified operating range of input voltages for the converter, the DC voltage sustained by the reset capacitor 106 $C_{reset}$ will be less than a maximum preset threshold value. In general, for any input voltage $V_{in}$, the steadystate DC voltage sustained by the reset capacitor is $$V_C = \frac{V_{in}}{1-D} \quad (3)$$

where D is the duty cycle, which is necessarily in the range $0 \leq D \leq 1$. The duty cycle is related to the input and output voltages $V_0$ and $V_{in}$, and to the transformer turns ratios m and n by the equation:

$$D = \frac{V_0}{V_{in}} \cdot \frac{n}{m+1} \quad (4)$$

Thus, from Equation 3, when the input voltage $V_{in}$ decreases to $$V_{in} = V_o \cdot \frac{n}{m+1} \quad (5)$$

then D=1, and the reset capacitor voltage $V_c$ becomes arbitrarily large, as indicated by Equation 3; this condition of high reset capacitor voltage must be prevented to provide reliable operation of the converter. Additionally, if the input voltage becomes larger than the high voltage level input voltage, the reset capacitor voltage must become larger in value than a desired maximum value dictated by other design considerations.

To prevent the reset capacitor voltage from becoming too large, the reference voltage $V_{max}$, at input lead 401 in FIG. 4 is selected to be less than a maximum design voltage of the reset capacitor. When the reset capacitor voltage $V_c$ is less than $V_{max}$, the output voltage from the lower operational amplifier is a high value, and reverse biases diode 418. The bias resistor 419 connects a source voltage to the cathodes of the diodes 408 and 418. The resulting bias voltage causes the anode voltage of diode 408 to be slightly higher (approximately 0.7 volt) than the output voltage of the upper operational amplifier 405 under these conditions, and will thus track the output voltage of the upper operational amplifier 405. Thus the feedback path from the output voltage $V_0$ from the DC-DC converter output to the input to the PWM controller is the operational control path when the reset capacitor voltage is less than $V_{max}$. This is the normal operational mode of the converter.

If the reset capacitor voltage rises above $V_{max}$ under abnormal input voltage conditions for the converter as described above, then the output voltage of the lower operational amplifier 415 decreases until diode 418 becomes forward biased, and diode 408 becomes back biased. Under these conditions the feedback path from the reset capacitor voltage to the input to the PWM controller becomes the operational feedback path, and the duty cycle D is controlled by the PWM controller to regulate the voltage on the reset capacitor, rather than the output voltage of the converter.

For operational compatibility, the two operative feedback loops are arranged with the same input-output polarity, i.e., an increase of the controlled voltage (i.e., either the output voltage of the converter, or the reset capacitor voltage) results in the same polarity of the change in the error voltage applied to the input of the PWM controller. From Equation 3, the reset capacitor voltage can be decreased by a decrease in the value of D. From Equation 4, the output voltage of the converter can also be decreased by a decrease in the value of D.

Figure 5:
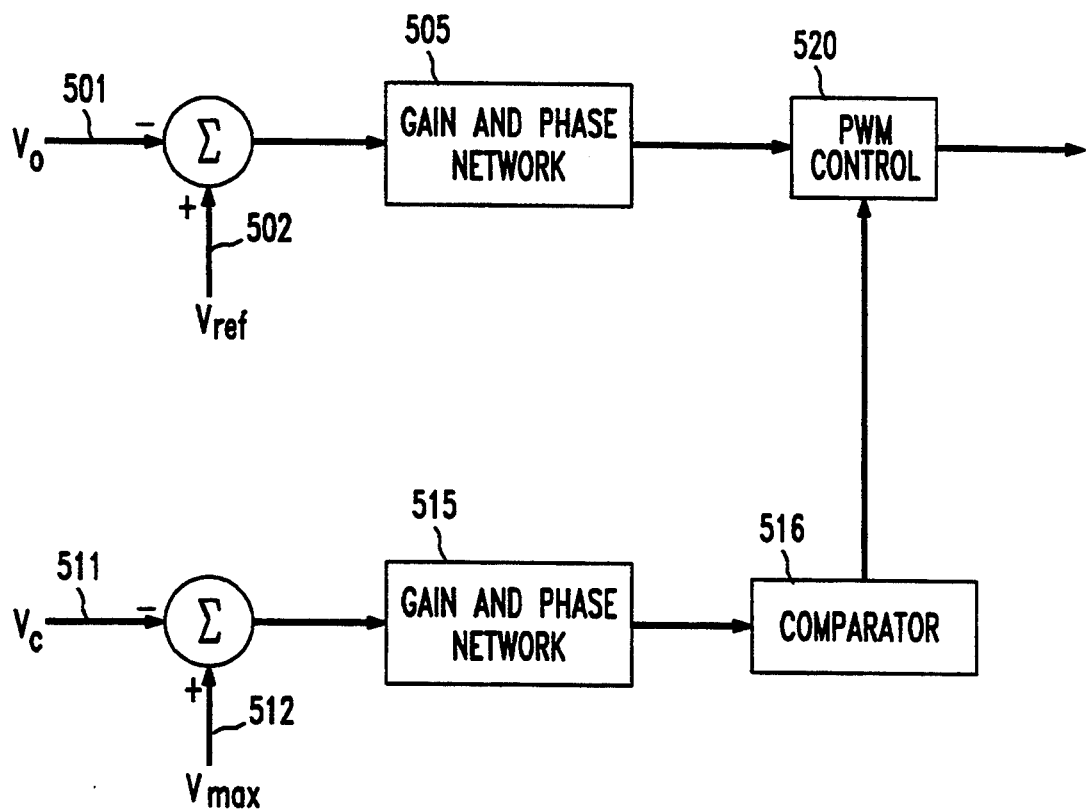
FIG. 5 is a block schematic of a control system for limiting a voltage of a reset capacitor voltage to some safe threshold value.

Another functional implementation of a feedback control for limiting the reset capacitor voltage, embodying the principles of the invention, is shown in the FIG. 5. The output voltage is applied to the input lead 501, differenced (i.e. summed) with the reference voltage on lead 502 and coupled via the gain and phase network 505 to the PWM control 520 in order to control the power switches to regulate the output. The reset capacitor voltage is applied to the lead 511 and differenced (i.e. summed) with a threshold voltage on lead 512. The differenced (i.e. summed) output is connected, via a gain and phase network to a comparator 516 which converts the output of network 515 to a digital state of either one or zero. If the reset capacitor voltage exceeds an allowable limit the output of the comparator 516 is one state which is applied to the PWM control 520 to limit its output to a low duty cycle until the reset capacitor voltage drops below the threshold value.

I claim:

1. A power converter circuit including:
   a power transformer providing galvanic isolation between an input and an output; the power transformer requiring a periodic reset of a core flux with the voltage stored on a reset capacitor;
   a power switch connecting the input to the power transformer;
   a voltage regulation feedback control to control a duty cycle of the power switch to regulate a voltage at the output;
   a reset capacitor voltage control circuit operative to block a response of the converter's voltage regulation feedback control to a voltage at the output and operate the feedback control in response to a voltage of the reset capacitor exceeding a preset threshold voltage to control the duty cycle of the power switch to limit a voltage of the reset capacitor whenever the reset capacitor sustains a voltage above the preset threshold.

2. A power converter circuit as claimed in claim 1, comprising:
   the reset capacitor voltage control circuit including:
   means to compare the reset capacitor voltage with a threshold voltage defining a maximum allowable reset capacitor voltage and means responsive to the means to compare to operate the voltage regulation feedback control to control a duty cycle of the power switch to regulate the reset capacitor voltage.

3. A power converter circuit as claimed in claim 1, comprising:
   the reset capacitor voltage control circuit including:
   means to compare the reset capacitor voltage with a threshold voltage defining a maximum allowable reset capacitor voltage and means responsive to the means to compare to operate the voltage regulation feedback control to limit a duty cycle of the power switch to a low value to limit the reset capacitor voltage.

4. A power converter comprising:
   an input for accepting a DC voltage;
   a power transformer requiring a periodic driven reset of its core flux;
   an output connected to the transformer and arranged to accept a load to be energized;
   power switching circuitry for periodically connecting the input to the transformer;
   feedback regulation connected for driving the power switching circuitry and having a first and second mode of operation and operative in the first mode to maintain a desired voltage at the output
   a charge storage capacitor connected to the power switching circuitry for enabling periodic recycling of core flux of the transformer;
   means for monitoring a voltage of the charge storage capacitor,
   means connected to the means for monitoring and responsive to the voltage of the charge storage capacitor exceeding a threshold voltage for controlling the feedback regulation of the converter to operate in the second mode independent of and in substitution of regulation of the voltage of the output in the first mode to limit the maximum voltage which may be attained by the charge storage capacitor.

5. A power converter as claimed in claim 4 comprising:
   the means for controlling the feedback regulation including:
   means for adjusting a voltage defining the PWM for driving the power switching circuitry in order to regulate the voltage of the charge storage capacitor.

6. A power converter as claimed in claim 4 comprising:
   the means for controlling the feedback regulation including:
   means for limiting the PWM for driving the power switching circuitry in order to limit the voltage of the charge storage capacitor.

7. A DC-DC converter comprising:
   an input for accepting a DC voltage;
   a power transformer;

a first and second power switch for completing a circuit connecting the input to the primary winding;

a PWM drive circuit for supplying drive signals to the first and second power switch;

a transformer reset capacitor connected to a winding of the power transformer and operative through the second power switch to reset a magnetizing inductance of the power transformer;, an output for accepting a load;

a regulation control including:

means for regulating a voltage of the output by monitoring the voltage of the output and generating an error signal applied to control the PWM drive circuit; and a protection circuit including:

means for monitoring a voltage of the transformer reset capacitor;

means for detecting a condition in which the voltage of the transformer reset capacitor exceeds a preset voltage limit;

the PWM drive circuit responding to the detected condition to disable the means for regulating a voltage of the output and limit a duty cycle of one of the power switches to a value less than that needed to regulate the output voltage for a time interval sufficient to allow the voltage of the transformer reset capacitor to drop below the threshold value.

8. A DC-DC converter comprising:

an input for accepting a DC voltage;

a power transformer;

a first and second power switch for completing a circuit connecting the input to the primary winding;

a PWM drive circuit for supplying drive signals to the first and second power switch;

a transformer reset capacitor connected to a winding of the power transformer and operative through the second power switch to reset a magnetizing inductance of the power transformer;

an output for accepting a load;

a regulation control including:

means for regulating a voltage of the output by monitoring the voltage of the output and generating an error signal applied to control the PWM drive circuit; and a protection circuit including:

means for monitoring a voltage of the transformer reset capacitor and comparing this voltage with a threshold voltage;

means for generating a protection signal in response to the voltage of the transformer reset capacitor exceeding the threshold voltage;

the PWM drive circuit responding to the protection signal to disable the means for regulating a voltage of the output and limit a duty cycle of one of the power switches to a value less than that needed to regulate the output voltage for a time interval sufficient to allow the voltage of the transformer reset capacitor to drop below the threshold value.

9. A DC-DC converter, comprising:

an input for accepting a DC voltage;

a power transformer including a primary winding and a secondary winding;

a first and second power switch for completing a circuit connection to the primary winding;

a transformer reset capacitor connected to and operative through the second power switch to reset a magnetic core of the transformer;

an output for accepting a load;

a regulation control including; a first voltage error amplifier connected to monitor a voltage at the output and generate a first error voltage responsive to a difference between a first reference voltage and a voltage representative of the voltage at the output, a second voltage error amplifier connected to monitor a voltage of the reset capacitor to generate a second error voltage responsive to a difference between a second reference voltage and a voltage representative of the voltage of the reset capacitor;

a PWM circuit for supplying drive signals to the first and second power switch to control their respective conducting intervals;

a disjunctive gating circuit for selectively connecting only one of the first and second error voltages to the PWM circuit;

the first and second error amplifier circuits being connected to couple the first error voltage to the PWM circuit to regulate the voltage at the output if the voltage of the reset capacitor is within a predefined voltage range and couple the second error voltage to the PWM circuit to regulate the voltage of the reset capacitor if the voltage of the reset capacitor exceeds a threshold value.

* * * * *